(12) United States Patent
Soloway

(10) Patent No.: US 9,846,023 B1
(45) Date of Patent: Dec. 19, 2017

(54) ELECTROMAGNETIC MONITORING AND CONTROL OF A PLURALITY OF NANOSATELLITES

(71) Applicant: The United States of America as Represented by the Administrator of the National Aeronautics & Space Administration (NASA), Washington, DC (US)

(72) Inventor: Donald I. Soloway, San Jose, CA (US)

(73) Assignee: THE UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 628 days.

(21) Appl. No.: 14/321,447

(22) Filed: Jul. 1, 2014

(51) Int. Cl.
| | | |
|---|---|---|
| *G01B 7/00* | (2006.01) | |
| *G01B 7/30* | (2006.01) | |
| *G01B 5/02* | (2006.01) | |
| *B64G 1/10* | (2006.01) | |
| *B64G 1/24* | (2006.01) | |
| *B64G 1/36* | (2006.01) | |
| *G01S 5/02* | (2010.01) | |

(52) U.S. Cl.
CPC .............. *G01B 7/003* (2013.01); *G01B 7/30* (2013.01); *B64G 1/1085* (2013.01); *B64G 1/24* (2013.01); *B64G 1/366* (2013.01); *G01S 5/0247* (2013.01); *G01S 5/0284* (2013.01)

(58) Field of Classification Search
USPC ........................................................... 702/150
See application file for complete search history.

(56) References Cited

U.S. PATENT DOCUMENTS

| | | | | |
|---|---|---|---|---|
| 6,634,603 | B2 * | 10/2003 | Cooper ................... | B64G 1/24 244/166 |
| 2005/0248491 | A1 * | 11/2005 | Leyre ...................... | B64G 1/24 343/702 |
| 2007/0295865 | A1 * | 12/2007 | Maini ................... | B64G 1/1085 244/166 |
| 2013/0218516 | A1 * | 8/2013 | Yu .......................... | G01B 7/004 702/150 |

* cited by examiner

*Primary Examiner* — Gregory J Toatley
*Assistant Examiner* — Terence Stifter, Jr.
(74) *Attorney, Agent, or Firm* — John F. Schipper; Robert M. Padilla; Mark P. Dvorscak

(57) ABSTRACT

A method for monitoring position of and controlling a second nanosatellite (NS) relative to a position of a first NS. Each of the first and second NSs has a rectangular or cubical configuration of independently activatable, current-carrying solenoids, each solenoid having an independent magnetic dipole moment vector, $\mu 1$ and $\mu 2$. A vector force F and a vector torque are expressed as linear or bilinear combinations of the first set and second set of magnetic moments, and a distance vector extending between the first and second NSs is estimated. Control equations are applied to estimate vectors, $\mu 1$ and $\mu 2$, required to move the NSs toward a desired NS configuration. This extends to control of N nanosatellites.

9 Claims, 6 Drawing Sheets

ELECTROMAGNETIC MONITORING AND CONTROL OF A PLURALITY OF NANOSATELLITES

SOURCE OF THE INVENTION

The invention described herein was made by an employee of the United States Government and may be manufactured and used by or for the Government of the United States of America for governmental purposes without the payment of any royalties thereon or therefore.

FIELD OF THE INVENTION

This invention relates to characterization and control of one or more nanosatellites by a designated control nanosatellite, using magnetic field measurements.

BACKGROUND OF THE INVENTION

Ideally, monitoring and controlling one or more of a plurality of nanosatellites relative to a reference body or reference position would allow (i) control of relative motion of each of the nanosatellites, (ii) power or energy transfer between two or more of the nanosatellites, and (iii) data communication between two or more of the nanosatellites. However, this monitoring of position requires reasonably accurate specification of vector coordinates of the nanosatellites that interact with each other. At first impression, the number of independent equations appears to be less than the number of independent variables, such as location coordinates, which presents a problem for a complete specification. This problem can be resolved in some configurations and may be extendable to other geometric configurations as well.

Electromagnetic controller satellite formation has been studied for large satellites and has been studied and constructed for small satellites. The operating distances for previous applications requires significant electrical power. For example, an implementation of single access control for a large satellite requires more than 300 Watts. A typical nanosatellite operates on 2.5-10 Watts of power, which makes a large satellite impractical for nanosatellite use.

Design of three-axis control in the prior art uses a configuration that generates a single magnetic dipole that can be oriented in any direction. When two satellites in such a system are pushing or pulling in unison, the dipoles are aligned, which does not allow relative orientation of the two satellites without use of some reaction device, such as mechanical reaction wheels.

For efficient control, at least one of a plurality of satellites requires information on relative location and relative orientation of each of the other satellites. Satellite systems in the prior art resolve this requirement by assuming that each satellite knows its own location and orientation and frequently transmits this information to a reference satellite. This is a costly process for accurate detection in a nanosatellite system. GPS or a similar process can only be used once or twice per day, because of the large associated power consumption. Each participating satellite in such a system must use a radio device to transfer this information to the reference satellite. Because of the fast response of a control system, the increasing "staleness" of the information, and the time required to transfer this information, operation may tend to destabilize the control system. For example, a satellite system recently tested on the I.S.S. required that the control system processing rate be reduced by a factor of about ten, in order to deal with this latency and avoid destabilization. The smallest electromagnet presently available measures 77 cm by 13 cm, but the smallest nanosatellite has dimensions of about 10×10 by 10 cm.

What is needed is a nanosatellite control system that avoids or minimizes the impact of these limitations: (1) large power consumption; (2) use of additional reaction wheel to manage single dipole limitation; (3) each satellite has knowledge of its location and orientation information; and (4) sensing device for each satellite determining its own location and orientation.

SUMMARY OF THE INVENTION

A reference nanosatellite establishes a Cartesian or other three dimensional coordinate system (x,y,z) for an array of two or more nanosatellites, including the reference. One, two, three or more perpendicularly oriented solenoids associated with each nanosatellite allow three dimensional control of the magnetic moment $\mu$ associated with a magnetic moment source.

In lowest order or degree of d, a magnetic field vector B(d) produced by a magnetic moment vector $\mu$ (assumed to be known and controllable) is a linear vector relationship between B(d) and m, and this relationship is homogeneous (of degree −3) in the scalar magnitude (d=|d|) of the distance vector d. The vector d extends between two nanosatellites and is expressed as a scalar d, multiplied by a unit length vector $\alpha=(\alpha x, \alpha y, \alpha z)$, whose components are direction cosines of the vector d, referenced to the (x,y,z) Cartesian coordinated system. A magnetic moment $\mu$ associated with a given nanosatellite is controlled by increasing or decreasing the current I moving through one or more of the solenoids on the nanosatellite.

The vector components of $\alpha$ are expressed as a linear sum of perpendicular components, $\mu$, $B(d)_{perp}$ and $\mu \times B(d)_{perp}$, where $$B(d)_{perp} = B(d) - (B \cdot \mu)\mu/|\mu|^2 \qquad (1)$$

is an augmented component of B(d), orthogonal to the magnetic moment vector $\mu$. The distance vector d is expressed as a linear combination of the vector components $\mu$, $B(d)_{perp}$ and $\mu \times B(d)_{perp}$, with linear combination coefficients that are determined from the original magnetic field flux equation, $$B(d) = (\mu 0/4\pi d^3)\{\mu - (\mu \cdot d)d/d^2\} = (\mu 0/4\pi d^3)\{\mu - (\mu \cdot \alpha)\alpha\}, \qquad (2)$$

where $\mu$ is magnetic permeability of a vacuum and $\alpha=d/|d|$ is not yet known.

The scalar distance d=|d| and the directional vector $\alpha=d/|d|$ are estimated. All relevant components of the local electromagnetic field force vector(s) F and local torque $\tau$ are thus determined, for each of one, two, three or more magnetic moment sources associated with a nanosatellite and for time-dependent sets of measurements. As these measurements are continued for a sequence of time intervals, the corresponding sequences of distance vectors d (computed) and magnetic vectors $\mu$ (measured and controlled for each magnetic field source) are available to compute torque vectors $\tau 12$ and force vectors F12, which act to move two or more interacting magnetic moment sources, $\mu 1$ and $\mu 2$, from initial locations and orientations to subsequent locations and orientations.

In one embodiment, it is assumed that vector orientation of each magnetic moment $\mu$ for a nanosatellite is known and that an associated magnetic field strength vector B can be measured at any point corresponding to location of another nanosatellite in the system. In other embodiments, the vector orientation of each magnetic moment in is not initially known but is estimated using measurements of a magnetic field strength vectors, B1 and B2, for activation of each of two or more solenoids associated with each nanosatellites. In each of these situations, a distance vector d=dα (angular orientation a and scalar distance d) and orientation of corresponding solenoids relative to the distance vector d are estimated, using a second system of orthogonal coordinates corresponding to the vectors B1, $B2_{perp}$=B2−(B1·B2)B1/$|B1|^2$, and $B1 \times B2_{perp}$. This provides vector separation information for each nanosatellite in the system, which is assumed to have a system diameter no greater than about 4 meters.

In one embodiment of an alignment and control system, force-induced and torque-induced motions in a plane of each of one, two, three or more solenoids of rectangular shape, each lying in the same plane, are computed at a selected sample rate, such as about 10 Hz, and the motion of each of the solenoids is visually displayed for each sampling time.

DESCRIPTION OF THE INVENTION

Figure 1:
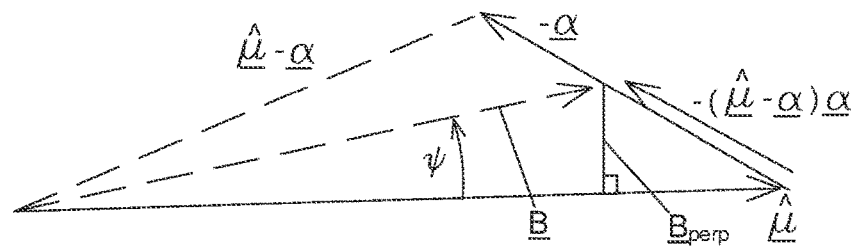
FIG. 1 schematically illustrates use of a single known normalized magnetic dipole moment vector µ^ and corresponding magnetic field strength vector B to estimate a distance vector d extending between first and second nanosatellites, relative to a coordinate system determined by µ and B, and use of this information to estimate electromagnetic forces and torques on a given nanosatellite, according to a first embodiment.

One challenge in monitoring and controlling one or more nanosatellites, using electromagnetic forces and torques, is determination of all relevant components of the three dimensional distance vectors that naturally arise in description of the physical parameters and resulting forces in such an environment. Beginning with the expression in Eq. (2) for a magnetic field flux that is generated by presence of a known magnetic moment µ, one is first confronted with estimation of the distance vector d (with source at a center of the magnetic moment source or associated solenoid(s)) at the point of measurement of the magnetic field B(d). Equation (2) is analyzed to estimate the vector components of d, using the known magnetic moment vector µ and the measurable field vector B(d). Equation (2) is rewritten as $$B'(d) = (4\pi/\mu 0)B(d) = \{\mu - (\mu \cdot d)d/d^2\}/d^3 = \{\mu - (\mu \cdot \alpha)\alpha\}/d^3. \quad (3)$$

$$d = d\alpha, \quad (4)$$

where α is a normalized vector (|α|=1) whose direction is parallel to the (unknown) direction of d. The normalized distance vector α is re-expressed as a sum of components, $$\alpha = a n1\hat{} + b n2\hat{} + c n3\hat{}, \quad (5)$$

where n1^, n2^ and n3^ are mutually perpendicular vectors, each of unit length, and a, b and c are to be estimated. Note that both the scalar value d and the vector α are initially unknown. One suitable set of choices for the vectors n1^, n2^ and n3^ is $$n1\hat{} = \mu\hat{} = \mu/|\mu|, \quad (6A)$$

$$n2\hat{} = \{B' - (B' \cdot \mu\hat{})\mu\hat{}\}/|B' - (B' \cdot \mu\hat{})\mu\hat{}|, \quad (6B)$$

$$n3\hat{} = n1\hat{} \times n2, \quad (6C)$$

$$(n1\hat{})^2 = (n2\hat{})^2 = (n3\hat{})^2 = 1. \quad (6D)$$

Using the decompositions set forth in Eqs. (4), (5) and (6), Eq. (3) can be rewritten $$\begin{aligned} B'(d)/\mu &= \{B' - (B' \cdot \mu\hat{})\mu\hat{} + (B' \cdot \mu\hat{})\mu\hat{}\}/\mu \\ &= \{\mu\hat{} - (\mu\hat{} \cdot \alpha)\alpha\}d^3, \\ &= \{\mu\hat{} - a\{a\mu\hat{} + bn2\hat{} + cn3\hat{}\}/d^3, \\ &= \{(1-(a)^2)\mu\hat{} - (ab)\{B' - (\mu\hat{} \cdot B')\mu\hat{}\}/ \\ &\quad |B' - (\mu\hat{} \cdot B')\mu\hat{}|\}(1/d^3), \end{aligned} \quad (7)$$

where the term involving the vector n3^ is dropped here because this vector only appears in one term in Eq. (7) (equivalent to c=0). Equation (7) can be rewritten by collecting all coefficients involving the vector µ^ and all coefficients involving the perpendicular vector B'−(B'·µ^)µ^ in Eq. (7), $$(1/\mu)\{B' - ((B' \cdot \mu\hat{})\mu\hat{} + (B' \cdot \mu\hat{})\mu\hat{}\} = \{(1-a^2)\mu\hat{} - ab\{B' - (B' \cdot \mu\hat{})\mu\hat{}\}/|(B' - B' \cdot \mu\hat{})\mu\hat{}|\}(1/d^3). \quad (8)$$

Separately collecting all coefficients of each of the two vectors µ^ and B'−(B'·µ^)µ^ yields the relations $$(1-a^2)/d^3 = (B' \cdot \mu\hat{})/\mu, \quad (9)$$

$$b = (-d^3/a\mu)|B' - ((B' \cdot \mu\hat{})\mu\hat{}|, \quad (10)$$

$$1-a^2-b^2 = (B' \cdot \mu\hat{})d^3/\mu, -(1/a^2)|(B' - B' \cdot \mu\hat{})\mu\hat{}|^2 d^6/\mu^2, \quad (11)$$

$$a^2 = \{B'^2 - (B' \cdot \mu\hat{})^2 \mu\hat{}\} d^3//\mu(B' \cdot \mu\hat{}) \quad (12)$$

$$d^3(B')^2/(B' \cdot \mu) = \mu, \quad (13)$$

Equations (7) and (9)-(13) determine the quantities d and a, and the distance vector d. The vector quantities B'(d) and B(d) are measurable for any selected distance vector d.

Figure 2:
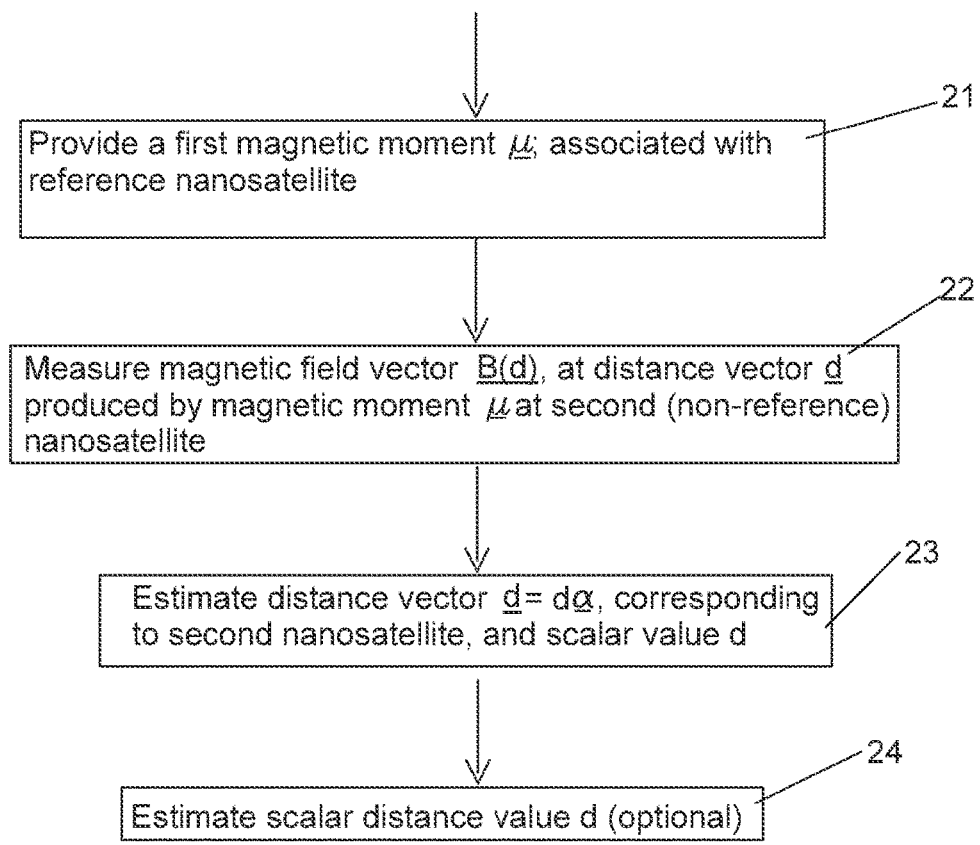
FIGS. 2, 4 and 6 are flow charts of different procedures for estimating distance vectors d and angular orientations of non-reference nanosatellites relative to a reference nanosatellite.

One suitable procedure is the following, illustrated in a flow chart in FIG. 2. In step 21, a first magnetic moment µ1, associated with the reference and controllable by the associated solenoid current, is selected. In step 22, a magnetic field, B'(d) or B(d), whose source is the magnetic moment µ1, is measured at a selected distance vector d=d12 (not yet estimated), which extends from a center of the reference to a center of a second (non-reference) nanosatellite. In step 23 (optional), the distance vector d12=dα is estimated for a location of the center of the second nanosatellite or associated solenoid relative to the center of the reference. Steps 22 and 23 can be repeated to estimate a distance vector d for location of the center of each non-reference nanosatellite solenoid.

Electromagnetic forces, F12 and F21=−F12 and the corresponding torques, τ12 and τ21=τ12 are computed in this two-moment system, the center locations for each non-reference nanosatellite are incremented for a sequence of time increments Δt.

A second method for estimation of the direction, in a plane P, of the normalized distance vector d uses a combined activation of two distinct solenoids to provide a first hybrid magnetic moment, $\mu1'=j1\mu1+k1\mu2$, and to provide a second hybrid magnetic moment, $\mu2'=j2\mu1+k2\mu2$, where $\mu1$ and $\mu2$ are magnetic moments of equal magnitude $\mu$ produced by activation of only the first solenoid and by activation of only the second solenoid, respectively, and j1, k1, j2 and k2 are selected coefficients, with $j1/k1 \neq \pm j2/k2$ and $|\mu1|=|\mu2|=\mu$. Equation (3) is re-expressed for normalized magnetic moments, $\mu1\hat{}$ and $\mu2\hat{}$, as $$B1'(d)=(4\pi/(\mu\mu0))B1(d)=\{\mu1'\hat{}-(\mu1'\hat{}\cdot\alpha)\alpha\}/d^3, \quad (14)$$

$$B2'(d)=(4\pi/(\mu\mu0))B2(d)=\{\mu2'\hat{}-(\mu2'\hat{}\cdot\alpha)\alpha\}/d^3, \quad (14)$$

$$|\mu1\hat{}|=|\mu2\hat{}|=1. \quad (16)$$

The vector lengths $|B1'(d)|$ and $|B2'(d)|$ will generally have different values, because the scalar products $(\mu1'\hat{}\cdot\alpha)$ and $(\mu2'\hat{}\cdot\alpha)$ will have different values. In a graphical illustration in FIG. 3, it is assumed that $\mu1'\hat{}\cdot\alpha=\cos\psi1$ and $\mu2\hat{}\cdot\alpha=\cos\psi2$ and that an angle value, $\psi=\psi0$, that minimizes the quantity $$L(\psi)^2=|\mu'\hat{}-(\mu'\hat{}\cdot\alpha)\alpha=\{1-(\mu'\hat{}\cdot\alpha)^2\}=1-\cos^2(\psi-\psi0) \quad (17)$$

is not yet known. The quantities $L(\psi1)^2$ and $L(\psi2)^2$ are measurable, using Eqs. (14)-(17), and can be re-expressed as $$\begin{bmatrix} \cos(2\psi1) & \sin(\psi1) \\ \cos(2\psi2) & \sin(2\psi2) \end{bmatrix} \begin{bmatrix} \cos(2\psi0) = 1 - 2L(\psi1)^2 \\ \sin(2\psi0) = 1 - 2L(\psi2)^2 \end{bmatrix} \quad (18)$$

where the angle $\psi0$ is to be estimated and other quantities are determinable. The 2×2 matrix in Eqs. (18) has an associated determinant, with a value, $Det=\sin 2(\psi2-\psi1)$, whose magnitude can be made as large as possible by one of the choices $\psi2-\psi1=\pm\pi/4, \pm 3\pi/4$. The solutions of Eqs. (18) are $$\begin{bmatrix} \cos(2\psi0) \\ \sin(2\psi0) \end{bmatrix} = \begin{bmatrix} \sin(2\psi2) & -\sin(2\psi1) \\ -\cos(2\psi2) & \cos(2\psi1) \end{bmatrix} \begin{bmatrix} \{1-2L(\psi1)^2\}/Det \\ \{1-2L(\psi2)^2\}/Det \end{bmatrix} \quad (19)$$

Figure 3:
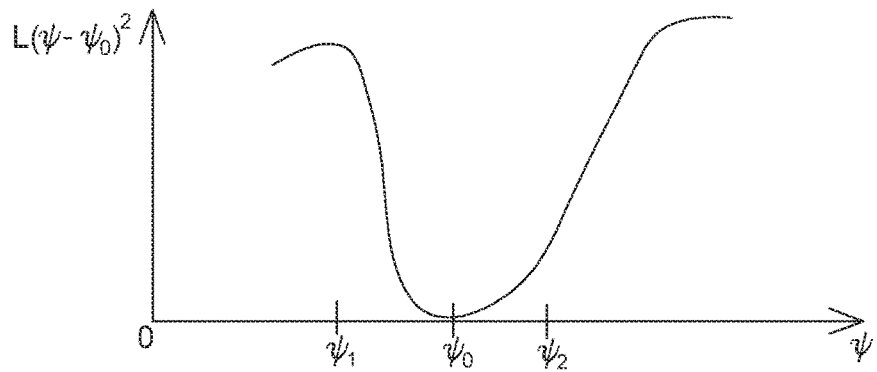
FIG. 3 graphically illustrates variation of a length squared $L(\psi-\psi 0)^2=|\hat{\mu}-(\hat{\mu}\cdot\alpha)\alpha|^2$ as a function of an angle $\psi-\psi 0$ between the normalized distance vector α and the normalized magnetic moment vector µ^.

The solution angle, $\psi=\psi0$, provides the angle at which the normalized distance vector $\alpha$ is oriented relative to the direction of the first magnetic moment $\mu1$ in the plane $P=P(x,y)$, as illustrated in FIGS. 1 and 3. This alternative procedure provides a second procedure for estimating the normalized distance vector $\alpha$. After the distance vector $d=d\alpha$ has been estimated, Eq. (3) may be used to estimate the scalar distance value d.

Figure 4:
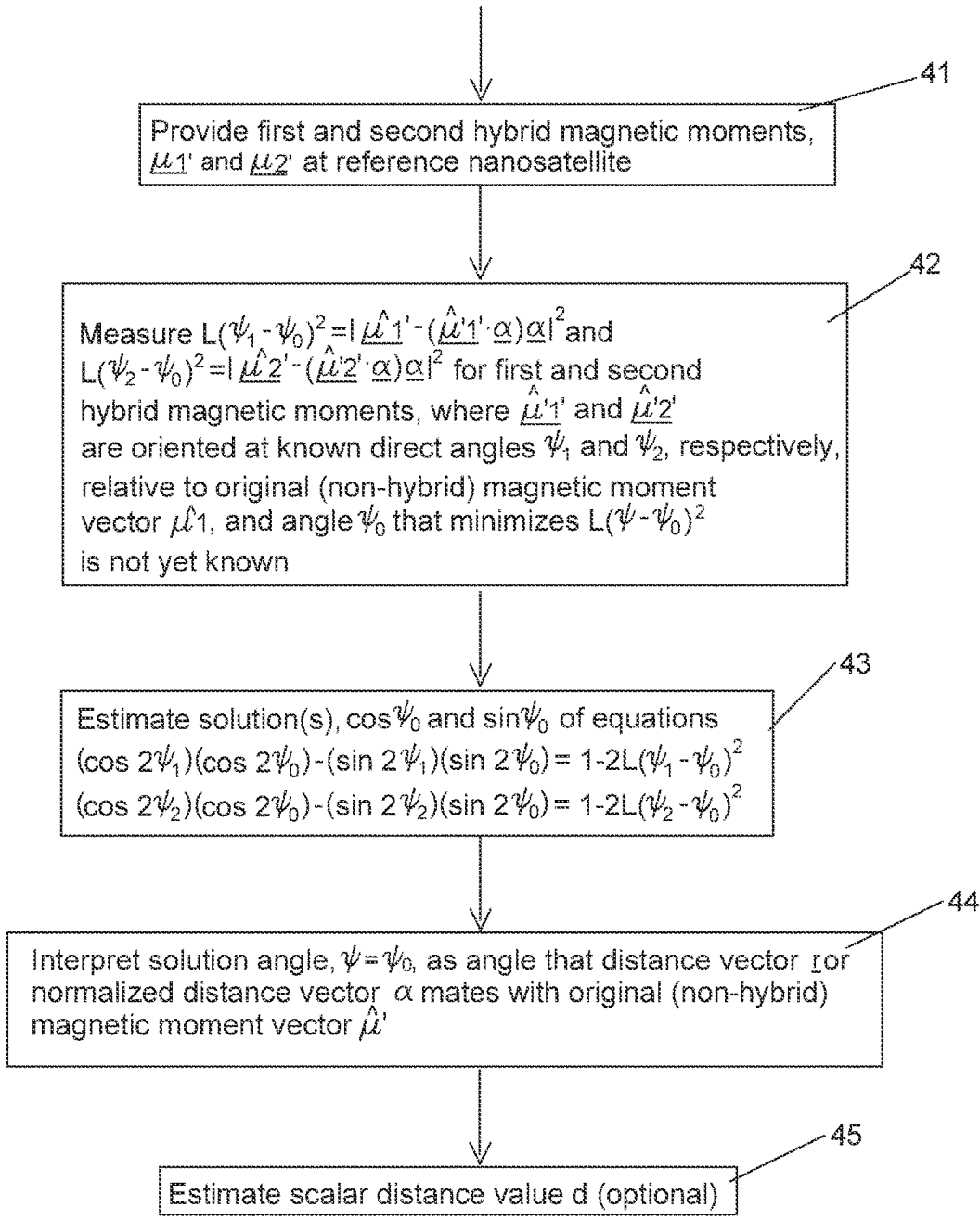

FIG. 4 is a flow chart of a second embodiment of a procedure for estimating the normalized distance vector $\alpha$ and the scalar distance value d. In step 41, first and second magnetic moments, $\mu1$ and $\mu2$, and hybrid magnetic moments, $\mu1'$ and $\mu2'$, as linear combinations of $\mu1$ and $\mu12$ (with associated angles $\psi1$ and $\psi2$), are provided for the reference satellite. In step 42, the length proportions squared, $L(\psi1-\psi0)^2=|\mu1'\hat{}-(\mu1'\hat{}\cdot\alpha)\alpha|^2$ and $L(\psi2-\psi0)^2=|\mu2'\hat{}-(\mu2'\hat{}\cdot\alpha)\alpha|^2$, are measured for known and distinct angles $\psi=\psi1$ and $\psi=\psi2$ for the hybrid magnetic moments, $\mu1'$ and $\mu2'$. Here, $\psi=\psi0$ is an angle value, unknown as yet, that minimizes the length squared value $L(\psi-\psi0)^2$.

In step 43, solutions, $\cos\psi0$ and $\sin\psi0$, are estimated for the equations $$\cos(2\psi1)\cos(2\psi0))+\sin(2\psi1)\sin(2\psi0)=1-2L(\psi1)^2,$$

$$\cos(2\psi2)\cos(2\psi0))+\sin(2\psi2)\sin(2\psi0)=1-2L(\psi2)^2.$$

In step 44, the solution angle, $\psi=\psi0$, is interpreted as the angle that distance vector d makes with a non-hybrid, magnetic moment vector $\mu1$ or $\mu2$. This indicates a direction in the plane $P(x,y)$ for the normalized distance vector $\alpha$. In step 45 (optional), the scalar distance value $d=|d|$ is estimated, using, for example, Eq. (3).

The developments of Eqs. (3)-(15), or (16)-(22), assume that the magnetic moment vector $\mu$ and the corresponding measured magnetic field vector B(d) are known. This requires knowledge of B(d) and $\mu$ for a single (initially unknown) distance vector d at which the field is measured. Alternatively, both the distance vector d and the direction of the moment $\mu$ may be unknown initially, although the magnitude, $|\mu|=\mu$ may be known, through control of the current supplied to the solenoid. In this situation, it is assumed that two solenoids, each with the same magnetic moment magnitude, $|\mu1|=|\mu2|=\mu$, are oriented at a known, non-zero angle (preferably $\pi/2$) relative to each other, that the two solenoids are associated with each other at a common end, and that the electromagnetic forces and motions are confined to a plane $P(x,y)$. The moments are expressed as analogous to Eqs. (3) and (4):

$$B1(d)=(\mu0/4\pi d^3)\{\mu1-(\mu1\cdot d)d/d^2)=(\mu0/4\pi d^3)\{\mu1-(\mu1\cdot\alpha)\alpha\}, \quad (20)$$

$$B2(d)=(\mu0/4\pi d^3)\{\mu2-(\mu2\cdot\alpha\cdot d)d/d^2)=(\mu0/4\pi d^3)\{\mu2-(\mu2\cdot\alpha)\alpha\} \quad (21)$$

$$d=d\alpha, \quad (22)$$

where the two solenoids have (approximately) a common distance vector d, whose angular orientation relative to the directions of the first and second solenoid s in the plane $P(x,y)$ is initially unknown. Note that the field vectors B1 and B2 are each perpendicular to the vector d or $\alpha$:

$$B1\cdot\alpha=0, \quad (23A)$$

$$B2\cdot\alpha=0, \quad (23B)$$

although generally $|B1| \neq |B2|$, because the moments $\mu1$ and $\mu2$ are generally oriented differently relative to the vector $\alpha$.

Introduce new unit length vectors, which are measurable, $$n1\hat{}=B1/|B1|, \quad (24)$$

$$n2\hat{}=B2/|B2|, \quad (25)$$

$$n2'\hat{}=\{n2\hat{}-(n1\hat{}\cdot n2)n1\hat{}\}/|n2\hat{}-(n1\hat{}\cdot n2)n1\hat{}|, \quad (26)$$

$$n3\hat{}=n1\hat{}\times n2'\hat{}, \quad (27)$$

where $n1\hat{}$, $n2'\hat{}$ and $n3'$ are mutually perpendicular and each has unit length. The normal forms of a plane P1 with normal vector B1 and of a plane P2 with normal vector B2 are $$n1\hat{}\cdot s-|B1|=0, \quad (28)$$

$$n2'\hat{}\cdot s-|B2|=0, \quad (29)$$

where $s=(x,y,z)$ is a coordinate vector in the coordinate system adopted here and $|B1|$ and $|B2|$ are the lengths of a first normal vector $(n1\hat{})$ and a second normal vector $(n2'\hat{})$, extending from the coordinate origin to the first plane P1 and from the coordinate origin to the second plane P2, respectively. Each of the planes, P1 and P2, contains the distance vector d, and the two normal vectors, $n1\hat{}$ and $n2'\hat{}$, (or $n1\hat{}$ and $n2\hat{}$) are not parallel. The intersection of the planes P1 and P2, therefore, defines a common line CL, which is parallel to the distance vector d.

Express the common line CL, lying in the intersection P1ΩP2, as a vector $$s = s1 n1\hat{} + s2 n2'\hat{} + s3 n3\hat{}. \quad (30)$$

The coefficients s1, s2 and s3 are determined using the normal forms in Eqs. (28) and (29):

$$n1'\hat{} \cdot s - |B1| = s1(n1\hat{} \cdot n1\hat{}) + s2(n1\hat{} \cdot n2'\hat{}) + s3(n1\hat{} \cdot n3\hat{}) - |B1| = 0, \quad (31)$$

$$n2'\hat{} \cdot s - |B2| = s1(n2'\hat{} \cdot n1\hat{}) + s2(n2'\hat{} \cdot n2'\hat{}) + s3(n2'\hat{} \cdot n3\hat{}) - |B2| = 0, \quad (32)$$

Taking account of the mutual orthogonality of n1ˆ, n2'ˆ and n3ˆ, a solution of Eqs. (31) and (32) is $$s1 = |B1|, \quad (33A)$$

$$s2 = |B2|, \quad (33B)$$

$$s3 \text{ is not determined}. \quad (33C)$$

Figure 5:
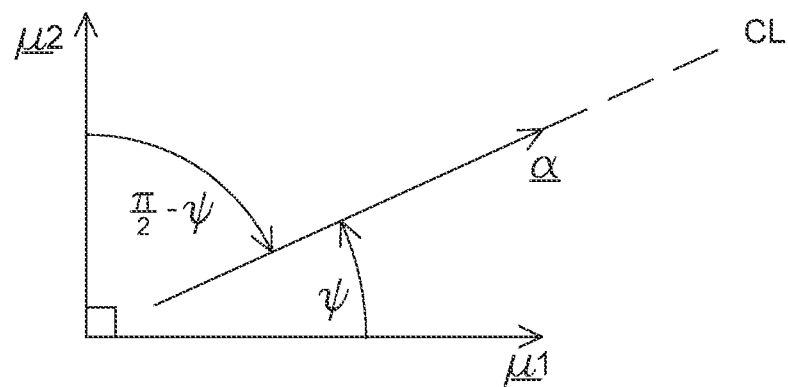
FIG. 5 illustrates orientation of α for one embodiment.

The intersection line CL is expressible as $$s = |B1| n1\hat{} + |B2| n2'\hat{} + s3 n3\hat{}, \quad (34)$$

$$\alpha = s/|s|, \quad (35)$$

which defines a direction of the normalized distance vector $\alpha = d/|d|$. FIG. 5 illustrates formation of the normalized distance vector α. This requires that B1 and B2 not be parallel, but does not require that B1 and B2 be perpendicular.

The scalar value d of the distance vector d is estimated using the relation $$|B1|^2 + |B2|^2 = (\mu_0/4\pi d^3)^2 \{2\mu^2 - \mu^2(\cos^2\psi + \sin^2\psi)\} = (\mu_0/4\pi d^3)^2 \mu^2, \quad (36)$$

where ψ is an angle between the vector α in the plane P(x,y) and the vector direction μ1ˆ. The angle ψ itself, illustrated in FIG. 5, is estimated using the relation $$B1 \cdot B2 = (\mu_0/4\pi d^3)^2 \{\mu_1 \cdot \mu_2 - \mu^2 \cos\psi \sin\psi\}$$
$$= -(\mu_0/4\pi\mu^3)^2 (\mu^2/2) \sin 2\psi\}, \quad (37)$$

where it is assumed here that the scalar value d is already estimated and that the magnetic moments μ1 and μ2 are orthogonal to each other so that μ1,μ2=0. These procedures, using Eqs. (34)-(35) or Eqs. (36)-(37), provide third and fourth alternative approaches to estimation of the scalar value d and the normalized distance vector α, which do not require ab initio knowledge of the separate vector directions of the magnetic moments μ1 and μ2, only the requirement that μ1μ2=0.

Figure 6:
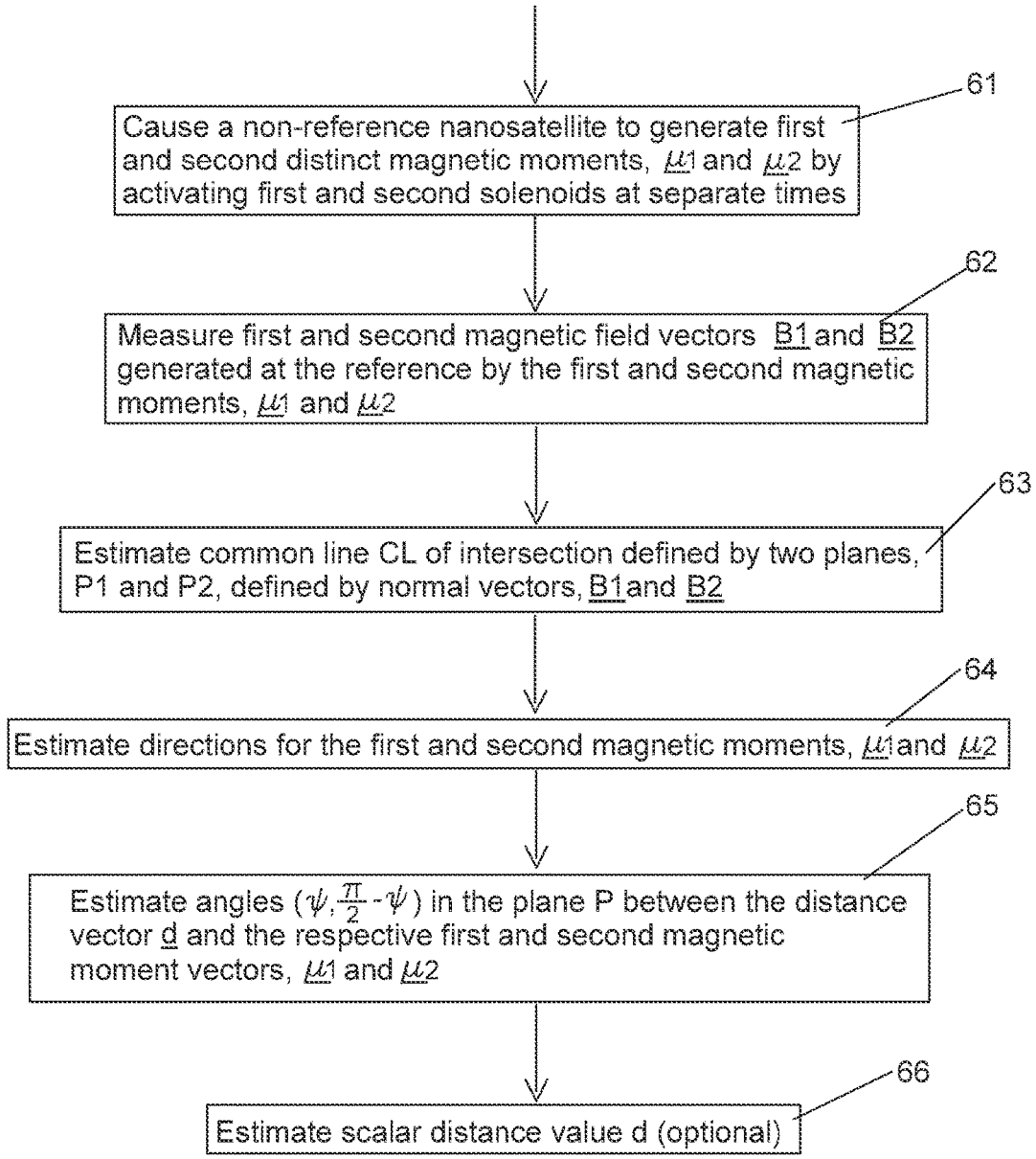

A suitable procedure for these alternatives is illustrated in a flow chart in FIG. 6. In step 61, the reference causes each non-reference nanosatellite, to generate two or more distinct magnetic moments, μ1 and μ2, by activating two or more solenoids on the non-reference nanosatellite at separate times. In step 62, a magnetic field strength vector, B1 and B2, for the respective magnetic moments is generated and measured at the center of the reference solenoids. In step 63, the distance vector d, extending from the center of the non-reference nanosatellite solenoid(s) to the center of the reference solenoid(s), is estimated, using the common line CL of intersection between the planes, P1 and P2, generated by the plane normals, B1 and B2. In step 64, the directions for the magnetic moments, μ1 and μ2, associated with the non-reference nanosatellite, are estimated. The angles (ψ, π/2–ψ) in the plane P between the distance vector d and the respective magnetic moments, μ1 and μ2, are estimated, in step 65. This determines the location coordinates of the center of the non-reference nanosatellite solenoid(s) and the angular orientation of the non-reference nanosatellite, relative to the center and coordinate axes orientation of the reference. In this embodiment, solenoids that produce the magnetic moments, μ1 and μ2, are activated on a non-reference nanosatellite, the corresponding magnetic field vectors, B1 and B2, thus produced are measured at the reference nanosatellite, and the corresponding angular orientations of the solenoids (indicated by μ1 and μ2) on the non-reference nanosatellite are estimated, using the angle pair (ψ, π/2–ψ) estimated at the reference. In step 66 (optional), the scalar distance value d is estimated, using Eq. (3). The roles of the reference and non-reference nanosatellites can be exchanged.

Application of Distance Vector Information to Satellite Location and Control.

In the development and application of the control law to follow, equations of motion of each of first and second solenoid rectangles (referred to herein as "cubes"), relative to each other are developed. The first and second solenoid cubes lie in a common plane P(x,y), illustrated in FIG. 7, and their subsequent motions are expressed in terms of motions only in this common plane. This model of two interacting cubes, the first a reference nanosatellite (i=1) and the second a controlled nanosatellite (k=2) is then extended to one reference satellite and to N−1 controlled nanosatellites (k=2, . . . , N), all lying in the common plane P(x,y) and each with its own activatable solenoids.

Figure 7:
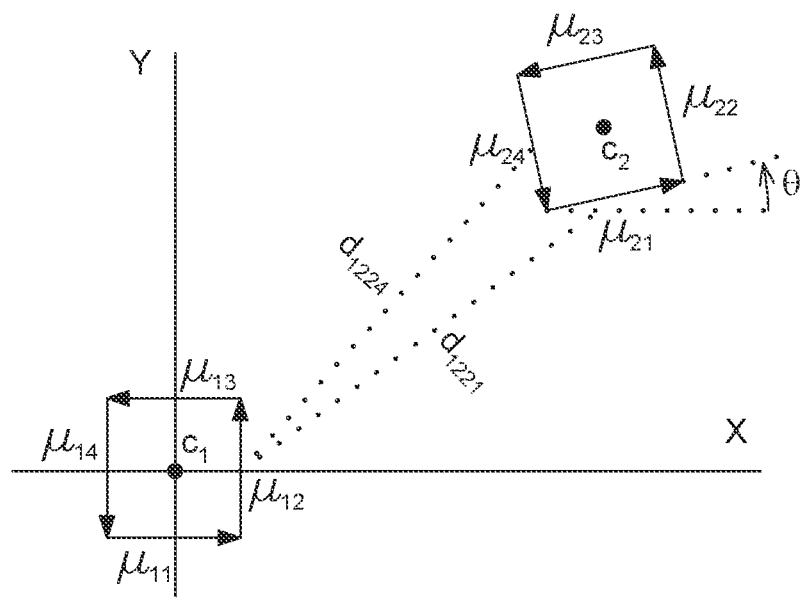
FIG. 7 illustrates two solenoid cubes (i=1 and k=2) confined to a plane P(x,y).

The first or reference cube (i=1) is defined by four line segments, indexed as j=1, 2, 3, 4, and by a cube center c1. Each of the four line segments for the first cube has a pair of indices, (ij)=(1,1), (1,2), (1,3) and (1,4), as illustrated in FIG. 7. In a similar manner, the second (controlled) nanosatellite (indexed here as k=2 or as k=2, 3, . . . , N) is defined by each of four line segments (m=1, 2, 3, 4) and by a center c2, with the pair of indices (k,m)=(2,1), (2,2), (2,3) and (2,4). Motions of the second nanosatellite (translation of the center, rotation about the center) are preferable stated with reference to location and angular orientation of the first or reference nanosatellite. Each solenoid (line segment) of each of the first and second nanosatellites is independently activated, and the magnitude and direction of the solenoid electrical current is independently selected.

Each of the four solenoid line segments that defines a nanosatellite solenoid (i=1 and k=2) has a line segment center. A distance vector, d=d(ij;k,m) (also written as $d_{ijkm}$ in the following) extending between a line segment (i,j) and a line segment (k,m) connects these two line centers in the development to follow. Each pair of solenoid line segments, (i,j) and (k,m), on the first and second cubes, respectively, has an associated pair of magnetic dipole moment vectors, $\mu_{i,j}$ and $\mu_{k,m}$, independently chosen, and an associated distance vector $d_{ijkm}$. Each of the quantities, $\mu_{i,j}$, $\mu_{km}$, and $d_{ijkm}$ will vary with time. A magnetic dipole moment, $\mu_{i,j}$ and/or $\mu_{km}$ may be 0 if that particular solenoid is not presently activated. More generally, each magnetic dipole moment vector, $\mu_{i,j}$ and/or $\mu_{km}$ may have a vector value 0 during one or more time intervals and may have a non-zero vector value during one or more other time intervals. The magnetic dipole moment vectors, $\mu_{i,j}$ and $\mu_{km}$, will be chosen during each time interval to move the two cubes (more generally, to move the N cubes) toward a desired cube configuration (relative location and relative angular orientation) over the course of time, and the desired cube configuration may change with passage of time. The preceding formalism for two nanosatellites is extended to a first (reference) nanosatellite and N−1 controlled or non-reference nanosatellites, all lying in a common plane P(x,y), where N is a reasonable number (e.g., N=2-20).

The length $\Delta t$ of all time intervals may be uniform (e.g., $\Delta t$=0.1 sec), or the time interval length may itself vary with time (e.g., $\Delta t$=0.01-0.5 sec) according to the rate at which the present cube configuration is to approach a desired cube configuration. Movement of the different cubes toward a desired cube configuration is facilitated by temporally varying values of a force vector $F_{ijkm}$ and/or by a temporally varying electrical torque vector $\tau_{ijkm}$. The force vectors $F_{ijkm}$ and/or the torque vectors $\tau_{ijkm}$ vary in response to the temporally changing (non-zero) magnetic dipole moments, $\mu_{i,j}$ and/or $\mu_{km}$, and the temporally changing solenoid distance vectors $d_{ijkm}$.

Figure 8:
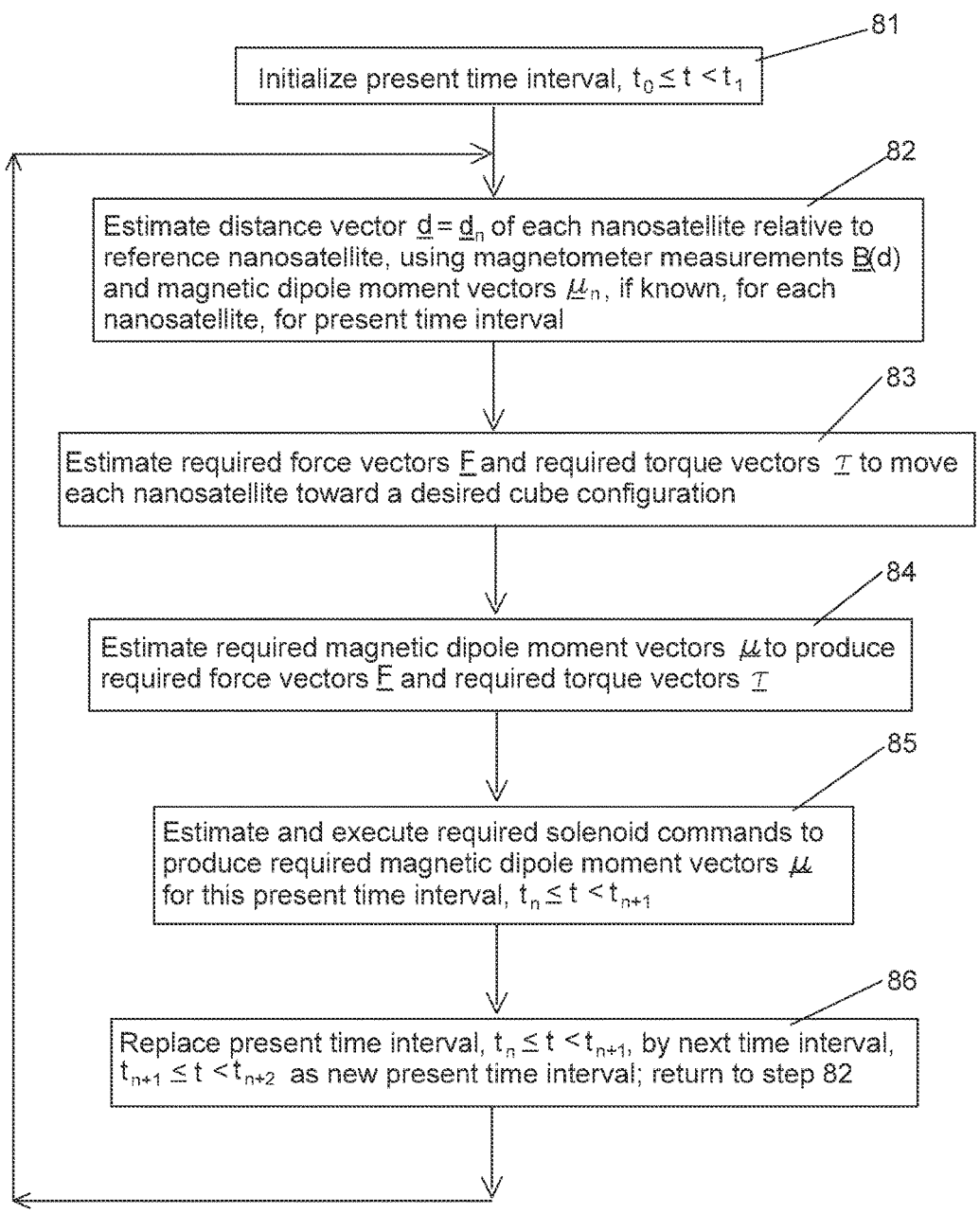
FIG. 8 is a general flow chart for practicing the invention.

FIG. 8 is a general flow chart illustrating broadly a procedure for a time interval sequence to estimate distance vectors d, magnetic dipole moment vectors $\mu$, force vectors F, torque vectors $\tau$, and solenoid commands that are presently estimated to be required to move a present cube configuration toward a desired cube configuration. In step 81, an initial time interval, $t_n \leq t < t_{n+1}$ with n=0, is identified. In step 82, a present distance vector, $d = d_n$ is estimated for each nanosatellite, relative to a first (reference) nanosatellite, using magnetometer measurements and magnetic dipole moment vectors $\mu_n$, if known, for each nanosatellite, for the present time interval ($t_n \leq t < t_{n+1}$). Step 82 may be implemented using any of the several embodiments discussed in connection with Eqs. (1)-(37), or any other suitable procedure for estimation of a distance vector, $d = d_n$, for each relevant or active solenoid on each nanosatellite.

In step 83, a force vector F and a torque vector T are estimated for each nanosatellite that are required to move each nanosatellite toward a desired cube configuration, for the present time interval ($t_n \leq t < t_{n+1}$). In step 84, a magnetic dipole moment vector $\mu$ is estimated for each solenoid on each nanosatellite that is required to provide the force vectors F and torque vectors $\tau$, for the present time interval ($t_n \leq t < t_{n+1}$). In step 85, the required solenoid commands (estimated in step 84) are executed, for the present time interval ($t_n \leq t < t_{n+1}$). In step 86, the present time interval, $t_n \leq t < t_{n+1}$, is replaced by the next time interval, $t_{n+1} \leq t < t_{n+2}$ (equivalent to incrementing the time interval index n to n+1), and the system returns to step 82.

Implementation of Nanosatellite Control Commands.

Returning to FIG. 7, the force on a given cube is equal to the sum of all the force interactions between the EMs on one cube and the EMs on the other cube. The force on the $i^{th}$ cube generated by the $k^{th}$ cube is given by $$Fc_i = \sum_{j=1}^{4} \sum_{k=1,k\neq i}^{\#Cubes} \sum_{m=1}^{4} F_{ijkm}, \quad (41)$$

where $$F_{ijkm} = M_F(\mu_{km}, d_{ijkm})\mu_{ij} \quad (42)$$

Using the far field model, we have, from Appendix I, $$M_F(\mu_{km}, d_{ijkm}) = -\frac{3\mu}{4\pi d_{ijkm}^5} \quad (43)$$

$$\left((d_{ijkm} \otimes \mu_{km}) + (\mu_{km} \otimes d_{ijkm}) + (\mu_{km}^T \Box d_{ijkm})\left(I - 5\frac{d_{ijkm} \otimes d_{ijkm}}{d_{ijkm}^T \Box d_{ijkm}}\right)\right)$$

The symbol $\otimes$ is the outer product operator.

Similarly, the torque on a given cube is the sum of all the torque interactions between the EMs on one cube and the EMs on the other cube, plus a cross product of the moment arm from the center of the cube to the center of the EM with the force on that EM. Thus, the torque on the $i^{th}$ cube by the $k^{th}$ cube is given by $$\tau c_i = \sum_{j=1}^{4} \sum_{k=1,k\neq i}^{\#Cubes} \sum_{m=1}^{4} \tau_{ijkm}, \quad (44)$$

where $$\tau_{ijkm} = M_\tau(\mu_{km}, d_{ijkm})\mu_{ij}, \quad (45)$$

$$M_\tau(\mu_{km}, d_{ijkm}) = \quad (46)$$

$$\frac{\mu_0}{4\pi}\left(\frac{3(\mu_{km} \cdot d_{ijkm})}{d_{ijkm}^5}d_{ijkm} - \frac{\mu_{km}}{d_{ijkm}^3}\right)_x^T + rc_{ij} \times M_F(\mu_{km}, d_{ijkm}) \text{ and}$$

$rc_{ij}$ the moment arm on from the center of the $i^{th}$ cube to the center of the $j^{th}$ EM The symbol $(\ )^T$, in Eq. (46) is the skew matrix.

To be able to control the nanosatellites, Eqs. (44)-(46) must be solved for the control input $\mu$ for each nanosatellite. To accomplish this, the $\mu$s will be determined in the reference frame that is attached to the body of the reference nanosatellite, referred to as the body frame.

To accomplish this, a transformation from the inertial frame to the body frame is needed. These $\mu$s will go through a rotation $\theta$ from the inertial frame to the body frame. Also note that the $\mu$s are note free to point in any arbitrary direction, the $\mu$s are fixed to the body frame, and thus the x-y components of each $\mu$ will be isolated by projection matrices, $I_x$ and $I_y$, associated with the x-axis and the y-axis. This can easily be extended to the z-axis.

To demonstrate this, we will work through the equations for two nanosatellites, which is easily extended to any reasonable number N of nanosatellites. The force acting on nanosatellite 1 (reference) can be written as $$Fc_1 = M_{F_{11}}\mu_{11} + M_{F_{12}}\mu_{12} + M_{F_{13}}\mu_{13} + M_{F_{14}}\mu_{14} \quad (47)$$

$$Fc_1 = \begin{bmatrix} Fc_{1x} \\ Fc_{1y} \end{bmatrix}$$

is the components of the force acting on nanosatellite 1 in the inertial frame, $$M_{F_{11}} = M_F(\mu_{21}, d_{1121}) + M_F(\mu_{22}, d_{1122}) + M_F(\mu_{23}, d_{1123}) + M_F(\mu_{24}, d_{1124}),$$

$$M_{F_{12}} = M_F(\mu_{21}, d_{1221}) + M_F(\mu_{22}, d_{1222}) + M_F(\mu_{23}, d_{1223}) + M_F(\mu_{24}, d_{1224}),$$

$$M_{F_{13}} = M_F(\mu_{21}, d_{1321}) + M_F(\mu_{22}, d_{1322}) + M_F(\mu_{23}, d_{1323}) + M_F(\mu_{24}, d_{1324}),$$

$$M_{F_{12}}=M_F(\mu_{21},d_{1421})+M_F(\mu_{22},d_{1422})+M_F(\mu_{23},d_{1423})+M_F(\mu_{24},d_{1424}) \quad (48)$$

Resolving and isolating the components of $\mu$ in the body frame Eq. (41) is $$Fc_1 = [\, M_{F_{11}}R(\theta)I_x + M_{F_{12}}R(\theta)I_y \quad M_{F_{13}}R(\theta)I_x + M_{F_{14}}R(\theta)I_y\,] \quad (49)$$

$$\begin{bmatrix} \mu_{11x} \\ \mu_{12y} \\ \mu_{13x} \\ \mu_{14y} \end{bmatrix}$$

where $\mu_{ijx}$ and $\mu_{iky}$ represents the $\mu$s in the body frame, $$I_x = \begin{bmatrix} 1 & 0 & 0 \\ 0 & 0 & 0 \\ 0 & 0 & 0 \end{bmatrix}, I_y = \begin{bmatrix} 0 & 0 & 0 \\ 0 & 1 & 0 \\ 0 & 0 & 0 \end{bmatrix}, \text{ and} \quad (50)$$

$$R(\theta_1) = \begin{bmatrix} \cos\theta_1 & -\sin\theta_1 & 0 \\ \sin\theta_1 & \cos\theta_1 & 0 \\ 0 & 0 & 1 \end{bmatrix}$$

Applying the same process to the torque equation, we have $$\tau c_{1z} = [\, M_{\tau 11}R(\theta_1)I_x + M_{\tau 12}R(\theta_1)I_y \quad M_{\tau 13}R(\theta_1)I_x + M_{\tau 14}R(\theta_1)I_y\,] \quad (51)$$

$$\begin{bmatrix} \mu_{11x} \\ \mu_{12y} \\ \mu_{13x} \\ \mu_{14y} \end{bmatrix}$$

where $$M_{\tau ij}=M_\tau(\mu_{21},d_{ij21})+M_\tau(\mu_{22},d_{ij22})+M_\tau(\mu_{23},d_{ij23})+M_\tau(\mu_{24},d_{ij24}),$$

Writing Eqs. (50), (51 and (52) in matrix form, we have $$\begin{bmatrix} Fc_{1x} \\ Fc_{1y} \\ Fc_{1z} \end{bmatrix} = \quad (53)$$

$$\begin{bmatrix} M_{F_{11}}R(\theta_1)I_x + M_{F_{12}}R(\theta_1)I_y & M_{F_{13}}R(\theta_1)I_x + M_{F_{14}}R(\theta_1)I_y \\ M_{F\tau 11}R(\theta_1)I_x + M_{F\tau 12}(\theta_1)I_y & M_{F\tau 13}R(\theta_1)I_x + M_{F\tau 14}R(\theta_1)I_y \end{bmatrix}$$

$$\begin{bmatrix} \mu_{11x} \\ \mu_{12y} \\ \mu_{13x} \\ \mu_{14y} \end{bmatrix}$$

Using a pseudo inverse operator, we can solve for the $\mu$s. Note, we are using four variables to solve for three values. This is an extra degree of freedom in the control input that can be used to optimize another constraint, if desired. Control Law Signal.

In the previous section we showed that, given a desired force, torque applied to $c_1$, the distance from each EM on $c_2$ to each EM on $c_1$, and the $\mu$s of $c_2$ we can solve for the $\mu$s of $c_1$. Here we will explore a very simple feedback control law to demonstrate in simulation that given a desired relative position and pointing angle, $c_1$ can be driven to the desired position and angle by control of $c_1$'s $\mu$s.

Because we want to exercise relative position control, we will define RelativePosition as the relative position from $c_2$ to $c_1$, expressed as a vector. We formulate an error signal between the relative position vector and a desired relative position we call DesiredDistance.

$$\text{Error=RelativePosition-DesiredDistance.} \quad (54)$$

For a linear time invariant plant, the proportional part of a PD controller is the Error multiplied by a gain. For an EM plant, this signal would be a force command Because force between two magnetic dipole moments is inversely proportional to the relative distance raised to the $4^{th}$ power, we compensate for this non-linearity by multiplying the Error signal by |RealtivePosition|$^4$. To include damping, we multiply the difference between the velocities by a gain. The control law has the form $$pd\text{Signal=Error } kp|\text{relativePosition}|^4+\text{Error } kd. \quad (55)$$

For the orientation of the nanosatellite we formulate an angle error signal. This will be a torque command. The torque between two magnetic dipole moments is inversely proportional to the relative distance raised to the 3rd power. Similar to above, we compensate for this by multiplying the error signal by |RelativePosition|$^3$. To include damping, we multiply the angular velocity by a gain. The control law has the form of $$pd\text{Signalw=angleError } kw|\text{relativePosition}|^3+w \, kdw \quad (56)$$

To solve for the $\mu$s, we let Fx=pdSignalx, Fy=pdSignaly and $\tau c_{1z}$=pdSignalw, the control law can be written as $$\begin{bmatrix} \mu_{11x} \\ \mu_{12y} \\ \mu_{13x} \\ \mu_{14y} \end{bmatrix} = \quad (57)$$

$$\begin{bmatrix} M_{F_{11}}R(\theta_1)I_x + M_{F_{12}}R(\theta_1)I_y & M_{F_{13}}R(\theta_1)I_x + M_{F_{14}}R(\theta_1)I_y \\ M_{F\tau 11}R(\theta_1)I_x + M_{F\tau 12}(\theta_1)I_y & M_{F\tau 13}R(\theta_1)I_x + M_{F\tau 14}R(\theta_1)I_y \end{bmatrix}^{-1}$$

$$\begin{bmatrix} pd\text{Signal}_x \\ pd\text{Signal}_y \\ pd\text{Signalw} \end{bmatrix}$$

APPENDIX. CONTROL SIGNAL FACTORED OUT OF FORCE EQUATION

In this Appendix we introduce a matrix form of the force equation. Then we show how we write the force equation in this form. We then conclude with the general case of the force and torque acting on a nanosatellite from N−1 other nanosatellites, where N is the total number of nanosatellites.

A typical form of the force acting on an electromagnet (EM) due to another electromagnet using the far field model is $$F_1 = -\frac{3\mu_0}{4\pi d^5}\left((\mu_1 \square \mu_2)d + (\mu_1 \square d)\mu_2 + (\mu_2 \square d)\mu_1 - 5\frac{(\mu_1 \square d)(\mu_2 \square d)}{d^2}d\right) \quad (61)$$

where
$\mu_0$ is the permeability of free space
$\mu_1$ is the magnetic dipole of EM 1

$\mu_2$ is the magnetic dipole of EM 2 d is the distance between the dipoles and $F_1$ is the force acting on EM 1

The identity $(x \cdot y)z = (z \otimes y) \cdot x$ is used to write Eq. (61) as $$F_1 = -\frac{3\mu_0}{4\pi d^5}\left((d \otimes \mu_2) + (\mu_2 \otimes d) + (\mu_2^T \square d)\left(I - 5\frac{d \otimes d}{d^T \square d}\right)\right) \cdot \mu_1, \quad (62)$$

where $\otimes$ is an outer product. Equation (62) can be written as a matrix times a vector, such as, $$F_1 = M_F(\mu_2, d) \cdot \mu_1, \quad (63)$$

where $$M_F(\mu_2, d) = -\frac{3\mu_0}{4\pi d^5}\left((d \otimes \mu_2) + (\mu_2 \otimes d) + (\mu_2^T \square d)\left(I - 5\frac{d \otimes d}{d^T \square d}\right)\right) \quad (64)$$

The value of writing the force equation in this form is that for a give force it is a simple process to solve for the control input $\mu_1$.

Re-Expression of the Force Equation.

First, we will verify the identity $(x \cdot y)z = (z \otimes y) \cdot x$, and then will show the substitution that gives the matrix form of the force equation. We first verify that $$(x \cdot y)z = (z \otimes y) \cdot x, \quad (65)$$

where $$x = \begin{bmatrix} x_1 \\ x_2 \\ x_3 \end{bmatrix}, y = \begin{bmatrix} y_1 \\ y_2 \\ y_3 \end{bmatrix}, \text{ and } z = \begin{bmatrix} z_1 \\ z_2 \\ z_3 \end{bmatrix} \quad (66)$$

Multiplying out the left hand side of Eq. (65), we obtain $$(x \cdot y)z = (x_1y_1 + x_2y_2 + x_3y_3)\begin{bmatrix} z_1 \\ z_2 \\ z_3 \end{bmatrix} = \begin{bmatrix} z_1y_1x_1 + z_1y_2x_2 + z_1y_3x_3 \\ z_2y_1x_1 + z_2y_2x_2 + z_2y_3x_3 \\ z_3y_1x_1 + z_3y_2x_2 + z_3y_3x_3 \end{bmatrix} \quad (67)$$

Multiplying out the right hand side we get the same vector. We have shown that $$(x \cdot y)z = (z \otimes y) \cdot x \quad (68)$$

Using the identity (68) to bring $\mu_1$ to the right side of each dot product, we have $$F_1 = \quad (69)$$
$$-\frac{3\mu_0}{4\pi d^5}\left((d \otimes \mu_2)\mu_1 + (\mu_2 \otimes d)\mu_1 + (\mu_2^T \square d)\mu_1 - 5\frac{(\mu_2^T d)}{d^2}(d \otimes d)\mu_1\right)$$

Now factoring out $\mu_1$, $$F_1 = -\frac{3\mu_0}{4\pi d^5}\left((d \otimes \mu_2) + (\mu_2 \otimes d) + (\mu_2^T \square d) - 5\frac{(\mu_2^T d)}{d^2}(d \otimes d)\right)\mu_1 \quad (70)$$

Then factoring $(\mu_2 \square d)$, we have $$F_1 = -\frac{3\mu_0}{4\pi d^5}\left((d \otimes \mu_2) + (\mu_2 \otimes d) + (\mu_2^T \square d)\left(I - 5\frac{d \otimes d}{d^T \square d}\right)\right) \cdot \mu_1. \quad (71)$$

Expressions for $M_F$ and $M_T$.

The notation that will be used here is the following.

$\mu_{ij}$ is the magnetic dipole moment of the $j^{th}$ EM on the cube.

$d_{ijkm}$ is distance vector from the center of the $m^{th}$ EM on the $k^{th}$ cube to the center of the $j^{th}$ EM on the cube.

$F_{ijkm}$ is the force on the $i^{th}$ cube, $j^{th}$ EM due to the $k^{th}$ cube $m^{th}$ EM.

$\tau_{ijkm}$ is the torque on the $i^{th}$ cube, $j^{th}$ EM due to the $k^{th}$ cube $m^{th}$ EM.

$rc_{ij}$ is the moment arm from the center of the $i^{th}$ cube to the center of the $j^{th}$ EM.

Using the above notation, the force and torque equations become $$Fc_i = \sum_{j=1}^{4}\sum_{k=1, k \neq i}^{Cubes}\sum_{m=1}^{4} F_{ijkm} \quad (72)$$

$$\tau c_i = \sum_{j=1}^{4}\sum_{k=1, k \neq i}^{Cubes}\sum_{m=1}^{4} \tau_{ijkm} \quad (73)$$

where $$F_{ijkm} = -\frac{3\mu_0}{4\pi d_{ijkm}^5}\left((\mu_{ij}\square\mu_{km})d_{ijkm} + (\mu_{ij}\square d_{ijkm})\mu_{km} + \right. \quad (74)$$
$$\left. (\mu_{km}\square d_{ijkm})\mu_{ij} - 5\frac{(\mu_{ij}\square d_{ijkm})(\mu_{km}\square d_{ijkm})}{d_{ijkm}^2}d_{ijkm}\right)$$

$$\tau_{ijkm} = \frac{\mu_0}{4\pi}\left(\mu_{ij} \times \left(\frac{3(\mu_{km} \cdot d_{ijmk})}{d_{ijkm}^5}d_{ijkm} - \frac{\mu_{km}}{d_{ijkm}^3}\right)\right) + rc_{ij} \times F_{ijmk} \quad (75)$$

The above equations will be re-expressed to be linear in $\mu_{ij}$.

Using the relationship $(x \cdot y) z = (z \otimes y) \cdot x = (z \otimes x) \cdot y$ to factor out $\mu_{ij}$ from the dot products, we obtain $$F_{ijkm} = -\frac{3\mu_0}{4\pi d_{ijkm}^5}\left((d_{ijkm} \otimes \mu_{km}) + (\mu_{km} \otimes d_{ijkm}) + \right. \quad (76)$$

$$\left. (\mu_{km}\square d_{ijkm}) - 5\frac{(\mu_{km}\square d_{ijkm})}{d_{ijkm}^2}(d_{ijkm} \otimes d_{ijkm})\right)\mu_{ij}$$

Factoring out $(\mu_{km}\square d_{ijkm})$ we obtain $$F_{ijkm} = -\frac{3\mu_0}{4\pi d_{ijkm}^5} \quad (77)$$
$$\left((d_{ijkm} \otimes \mu_{km}) + (\mu_{km} \otimes d_{ijkm}) + (\mu_{km}\square d_{ijkm})\left(I - 5\frac{(d_{ijkm} \otimes d_{ijkm})}{(d_{ijkm} \cdot d_{ijmk})}\right)\right)$$
$$\mu_{ij}$$

We define the matrix $$M_F(\mu_{km}, d_{ijkm}) = -\frac{3\mu_0}{4\pi d_{ijkm}^5} \quad (78)$$

$$\left((d_{ijkm} \otimes \mu_{km}) + (\mu_{km} \otimes d_{ijkm}) + (\mu_{km} \boxdot d_{ijkm})\left(I - 5\frac{(d_{ijkm} \otimes d_{ijkm})}{(d_{ijkm} \cdot d_{ijkm})}\right)\right)$$

The force equation is now written as $$F_{ijkm} = M_F(\mu_{km}, d_{ijkm})\mu_{ij} \quad (79)$$

Now factor out $\mu_{ij}$ from the torque equation. The cross product can be written in matrix form as $$a \times b = \quad (80)$$

$$[a]_x b = \begin{bmatrix} 0 & -a_3 & a_2 \\ a_3 & 0 & -a_1 \\ -a_2 & a_1 & 0 \end{bmatrix} \begin{bmatrix} b_1 \\ b_2 \\ b_3 \end{bmatrix} = [b]_x^T a = \begin{bmatrix} 0 & b_3 & -b_2 \\ -b_3 & 0 & b_1 \\ b_2 & -b_1 & 0 \end{bmatrix} \begin{bmatrix} a_1 \\ a_2 \\ a_3 \end{bmatrix}$$

We obtain $$\tau_{ijkm} = \frac{\mu_0}{4\pi}\left[\frac{3(\mu_{km} \cdot d_{ijkm})}{d_{ijmk}^5}d_{ijkm} - \frac{\mu_{km}}{d_{ijkm}^3}\right]_x^T \mu_{ij} + rc_{ij} \times F_{ijkm} \quad (81)$$

Substituting $M_F$ for $F_{ijkm}$, we obtain $$\tau_{ijkm} = \left(\frac{\mu_0}{4\pi}\left[\frac{3(\mu_{km} \cdot d_{ijkm})}{d_{ijkm}^5}d_{ijkm} - \frac{\mu_{km}}{d_{ijkm}^3}\right]_x^T + [rc_{ij}]_x M_F(\mu_{km}, d_{ijkm})\right)\mu_{ij}. \quad (82)$$

We define $$M_\tau(\mu_{km}, d_{ijkm}) = \quad (83)$$

$$\frac{\mu_0}{4\pi}\left[\frac{3(\mu_{km} \cdot d_{ijkm})}{d_{ijkm}^5}d_{ijkm} - \frac{\mu_{km}}{d_{ijkm}^3}\right]_x^T + [rc_{ij}]_x M_F(\mu_{km}, d_{ijkm}),$$

$$\tau_{ijkm} = M_\tau(\mu_{km}, d_{ijkm})\mu_{ij}. \quad (84)$$

Equations (79) and (84) are referred to as a matrix form of the force and torque equations respectively.

What is claimed is:

1. A method of monitoring and controlling a second nanosatellite relative to a position of a first nanosatellite, the method comprising:
   (i) initializing a time interval;
   (ii) for a present time interval, based on at least measured magnetometer data, estimating a distance vector that extends between a first location associated with a first nanosatellite and a second location associated with a second nanosatellite, the nanosatellites comprising respective first and second plurality of solenoids;
   (iii) estimating force vectors and torque vectors to move at least the second plurality of solenoids relative to the first nanosatellite;
   (iv) for at least the second nanosatellite, estimating magnetic dipole moment vectors associated with both force vectors and torque vectors;
   (v) causing at least the second plurality of solenoids to produce the magnetic dipole moment vectors;
   (vi) incrementing the present time interval, and returning to step (ii),
   wherein the first plurality of solenoids is arranged in a rectangular geometry.

2. The method according to claim 1, wherein the first location is on a first solenoid within the first plurality of solenoids, and the second location is on a second solenoid within the second plurality of solenoids.

3. The method according to claim 2, wherein the measured magnetometer data comprises a magnetic field vector value associated with the second solenoid.

4. The method according to claim 3, further comprising using the magnetic field vector value to estimate a magnitude of the distance vector.

5. The method according to claim 1, wherein each of the first plurality of solenoids is a current-carrying solenoid that can be independently activated.

6. The method according to claim 1, further comprising using an RF link to communicate commands from the first nanosatellite to the second nanosatellite to control the second plurality of solenoids.

7. A method of monitoring and controlling a second nanosatellite relative to a position of a first nanosatellite, the method comprising:
   (i) initializing a time interval;
   (ii) for a present time interval, based on at least measured magnetometer data, estimating a distance vector that extends between a first location associated with a first nanosatellite and a second location associated with a second nanosatellite, the nanosatellites comprising respective first and second plurality of solenoids, the first location being on a first solenoid within the first plurality of solenoids, the second location being on a second solenoid within the second plurality of solenoids, the measured magnetometer data comprising a magnetic field vector value associated with the second solenoid;
   (iii) estimating force vectors and torque vectors to move at least the second plurality of solenoids relative to the first nanosatellite;
   (iv) for at least the second nanosatellite, estimating magnetic dipole moment vectors associated with both force vectors and torque vectors;
   (v) causing at least the second plurality of solenoids to produce the magnetic dipole moment vectors;
   (vi) incrementing the present time interval, and returning to step (ii), and
   (vii) using the magnetic field vector value to estimate a normalized vector value associated with the distance vector.

8. The method according to claim 7, wherein each of the first plurality of solenoids is a current-carrying solenoid that can be independently activated.

9. The method according to claim 7, further comprising using an RF link to communicate commands from the first nanosatellite to the second nanosatellite to control the second plurality of solenoids.

* * * * *